Jan. 15, 1935.  E. E. WEMP  1,987,648
MECHANISM FOR CONTROLLING A CLUTCH OR THE LIKE
Filed Nov. 9, 1931  3 Sheets-Sheet 1
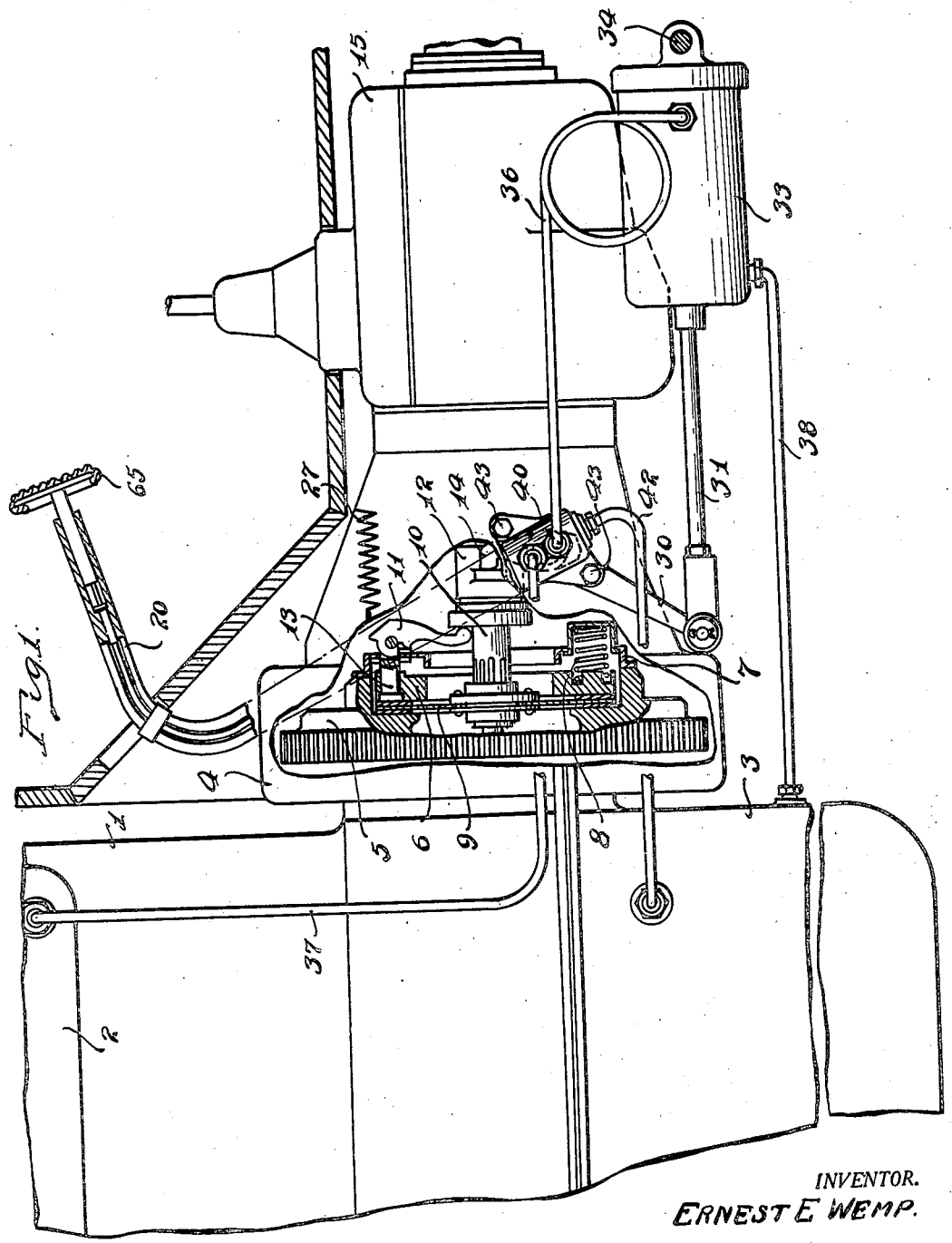
INVENTOR.
ERNEST E. WEMP.
BY Barnes & Kisselle
ATTORNEYS.

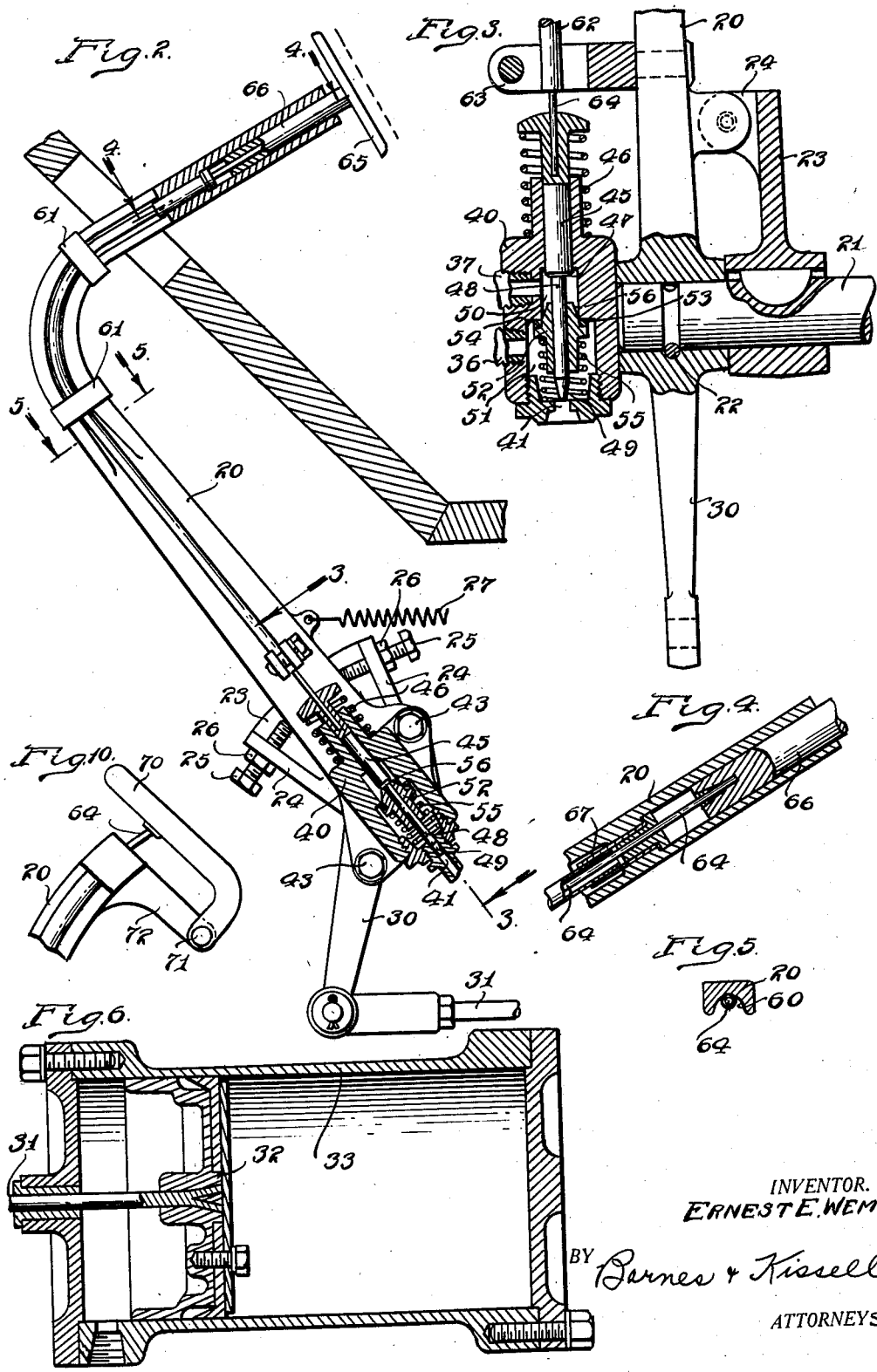

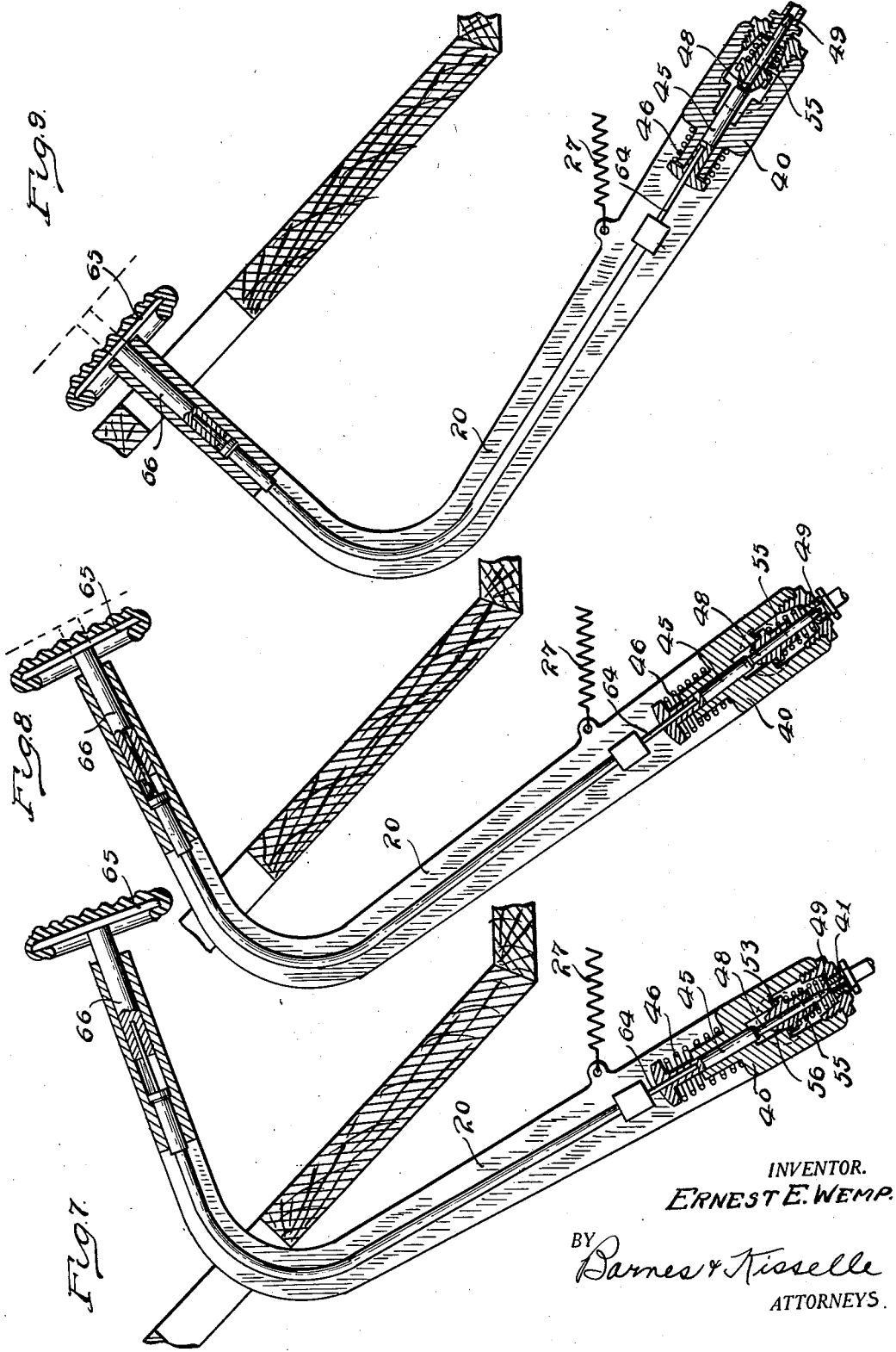

Patented Jan. 15, 1935

1,987,648

UNITED STATES PATENT OFFICE 1,987,648

MECHANISM FOR CONTROLLING A CLUTCH OR THE LIKE

Ernest E. Wemp, Detroit, Mich.

Application November 9, 1931, Serial No. 573,901

3 Claims. (Cl. 192—91)

This invention relates to the control of clutches for effecting engagement and disengagement thereof, and it is particularly concerned with such control of a clutch in an automotive vehicle.

The invention aims to provide an arrangement wherein the clutch may be released by power means. This releasing of the clutch by power makes for ease of operation which is especially desirable in large, powerful vehicles where clutches of high torque capacity are required as in these clutches the packing pressure is high, requiring a good deal of force to release. A power released clutch is disclosed in application Serial No. 538,126, filed May 18, 1931. The present invention embodies improvements thereover.

Automobile operators are accustomed to controlling a clutch through the means of a foot lever which is depressed to effect clutch disengagement, and which is released or allowed to retract in more or less of a controlled manner by the lifting of the foot, to effect clutch engagement. There is, accordingly, a more or less full stroke movement of a clutch foot lever. The present invention contemplates the provision of an arrangement wherein the clutch lever partakes of this full stroke movement in the release and engagement of a clutch, incorporating power means for actually releasing the clutch, and controllable in effecting clutch engagement. Associated with the lever are controlling instrumentalities which, by very small physical effort on the part of the operator, may be actuated to control the power means both in effecting release of the clutch and in effecting engagement thereof. Thus, while the foot of the operator may follow the foot lever through its full stroke of movement, only a light pressure need be exerted by the operator.

It will be seen, therefore, that the movements of the lever and the foot of the operator are conventional, and one with which practically all operators are accustomed. Yet the physical exertion is minimized. While it has been specified that the foot lever has the conventional full stroke movement, it is to be appreciated that different operators give the lever different stroke movements; one operator may move the lever through a large stroke practically down to the floor boards, and another operator may give the lever a stroke materially less than this yet sufficient to release the clutch. The present invention provides a combination of elements capable of being operated with different stroke movements as determined by the particular operator. Devices other than clutches may be operated by the mechanism which embody the features of this invention.

In the accompanying drawings:

Fig. 1 is a view illustrating an engine, clutch and clutch lever showing some of the clutch parts in section.

Fig. 2 is a view partly in side elevation and partly in section illustrating a lever arranged in accordance with the present invention.

Fig. 3 is an enlarged sectional view taken substantially on line 3—3 of Fig. 2.

Fig. 4 is an enlarged section taken substantially on line 4—4 of Fig. 2.

Fig. 5 is a section taken on line 5—5 of Fig. 2.

Fig. 6 is a sectional view taken through a controlling cylinder and piston.

Figs. 7, 8 and 9 are views of the lever showing different positions which it may take and illustrating some of the parts in section which are controlled by the operator.

Fig. 10 is a side elevation illustrating a modified form of foot pad.

In Fig. 1 there are a number of conventional parts of an automotive vehicle shown such as engine 1 with its intake manifold 2 and crank case 3. A clutch housing is shown at 4 within which is a flywheel 5, which together with a pressure ring 6 constitute the driving members of a clutch. A cover plate 7 is employed and the same backs up packing springs 8 which pack the pressure ring toward the fly wheel with these two parts frictionally engaging a driven disk 9 mounted upon a driven shaft 10.

Levers 11 may be fulcrumed on the cover plate and rockable clockwise by a control element 12 which is axially shiftable, in which movement the levers serve to retract the pressure ring 6 as by means of studs 13 for disengaging the clutch. In order to shift the member 12 from right to left to disengage the clutch there may be a yoke member, one arm of which is illustrated at 14, which engages the member 12 and shifts the same when the usual clutch pedal is depressed. Also there is shown in more or less conventional manner a case for speed change gears, as illustrated at 15. The parts thus described may be of any conventional type subject to change in details. It may be here pointed out also that the shiftable member 12 and clutch releasing levers may be arranged so that the clutch is released when the member 12 shifts from left to right as Fig. 1 is viewed. This is an optional arrangement.

A foot lever is shown at 20 and the same is mounted upon a clutch control shaft 21 (Fig. 3)

upon which shaft yoke 14 may be mounted. The lever 20 may be fulcrumed on the shaft 21 and held from displacement thereon by means of a pin 22. An arm 23 is fixed to the shaft 21 as by means of a key as shown, and this arm 23 preferably has extensions or wings 24 on opposite sides of the lever 20, and adjusting screws 25 may be taken through these wings to engage opposite sides of the lever, as shown in Fig. 2. Lock nuts 26 may be associated with the adjusting screws. The lever 20 is preferably held normally retracted as by means of a suitable return spring 27.

It will be seen from the above described structure that the shaft 21 may be rocked by manipulation of the lever 20, the same actuating through the arm 23 which is keyed to the shaft. This permits of positive manual control for the clutch releasing shaft 21 in the event of failure of the power means now to be described.

An arm 30 may be integral with the lever 20, and the same is connected as by means of a piston rod 31 to a piston 32 within a cylinder 33. The cylinder 33 may be mounted to rock as at 34 to accommodate an arcuate movement of the end of the arm 30. A pipe line 36 may connect into one side of the cylinder and through the means of a suitable control valve, to a line 37 connecting into the engine manifold 2. The other end of the cylinder preferably has an opening to permit of atmospheric pressure on the opposite side of the piston. Preferably, although not necessarily, this opening to atmospheric pressure may be connected by a tube 38 to the crank case of the engine, as shown in Fig. 1. The tube 38 preferably connects into the crank case of the engine above the oil level therein so that an oil laden mist may be drawn into the cylinder 33 for lubrication purposes. Also the line 38 is preferably arranged so that there is a gravity drain from cylinder 33 into crank case 3 to prevent accumulation of oil in cylinder 33.

A valve housing, as shown at 40, Fig. 3, is preferably arranged adjacent the axial center of rock shaft 21, and as shown, the lines 36 and 37 connect into this valve housing. The lines 36 and 37 may be of flexible tube and by arranging the valve housing adjacent the axial center of rock shaft 21 a minimum of flexing movement in the pipes 36 and 37 is caused. The valve housing has a port 41 which opens to atmospheric pressure. This port may open directly to the atmosphere as shown in Fig. 3, or it may, if desirable, be connected by a pipe line 42 to the engine crank case, as shown in Fig. 1, with the line 42 preferably arranged to effect a gravity drain from the valve housing to the crank case of the engine. The valve housing may be attached directly to the lever 2 as by means of having wings or extensions thereon through which bolts or the like 43 may be taken.

Mounted in the valve housing is the valve member which may be in the form of a plunger 45 held normally in the position shown in Fig. 3 as by means of the coil spring 46. This plunger has shoulder 47, a reduced section 48 which may have a tapered end 49 for cooperation with the port 41. The housing has a chamber 50 communicating with the vacuum line 37, and a chamber 51 communicating with the outlet port 41 and pipe line 36. A valve member, which advantageously is a combined seating valve and metering valve, as shown at 52, is disposed between the two chambers in the housing, and it may be provided with a gasket 53 for seating against a shoulder 54 between the two chambers. The valve may be held normally seated and closing off the two chambers by coil spring 55. This valve for metering purposes may have a tapering end 56 normally projecting into chamber 50. The reduced portion 48 of the plunger 45 may extend through the valve member 52 so that it may reciprocate with respect thereto.

The plunger 45 is reciprocable in its mounting under control of the operator. For this purpose an operable connection between the plunger and the foot pad on the pedal is provided. Such connection may take the form of a Bowden wire. The Bowden wire may, through its central portions, extend along side of the lever 20, as shown in Fig. 2, and the lever may be recessed, as shown at 60 (Fig. 5) for housing the Bowden wire, the same being held in place by clamps or the like 61. At the end near the valve the Bowden wire, the casing of which is illustrated at 62, may be spaced from the lever 20 and held by a bracket 63 so that the wire proper may have an end projecting into a socket in the plunger 45, as shown in Fig. 3. The wire proper is illustrated at 64. The foot pad for the lever is at 65, and may have a plunger portion 66 located in a bore in the end of the lever 20, and a wire 64 at this end of the lever may be attached to the plunger, as shown in Fig. 5. As shown, the wire 64 may project beyond its housing 62 which is preferably fixed at its end to the lever as by means of a sleeve 67.

It will be observed that upon the application of pressure to the pad 65 the Bowden wire may be shifted and the plunger 45 in the valve housing shifted. Preferably, upon shift of the plunger 45 its shoulder 47 may strike the end of the valve 52 causing it to move and permitting communication between chamber 50 and chamber 51. Likewise, its reduced portion 48 may project into the outlet port 41 thus closing it. There are several functions of this valve which advantageously operate in predetermined timed relation as will be more thoroughly appreciated in considering the operation more in detail.

In the normal clutch engaged position, the parts including the foot lever and valve are substantially in the position shown in Fig. 7 with the lever 20 retracted against a suitable stop or floorboards of the vehicle. The chambers 50 and 51 are closed off from each other and the port 41 is open. Accordingly, atmospheric pressure has entered port 41, passed through line 36 into the cylinder 33 and the clutch springs have engaged the clutch and retracted the piston 32 to a position substantially illustrated in Fig. 6. The usual arrangement is that there is a limited amount of movement which may be imparted to the lever 20 before release of the clutch packing springs begin. This is what is known as lash movement, and it is necessarily employed so that the packing springs come into full play before the lever 20 strikes its stop in its retracting movement. We have depicted this in Fig. 8, this view diagrammatically showing a position which the lever may take before there is any actual releasing action upon the clutch packing springs. In moving the lever from the position shown in Fig. 7 to the position shown in Fig. 8, the only force which need be overcome aside from the usual friction, is that of spring 27. The spring 46 is preferably strong enough to prevent movement of the valve 45 while the lever is being moved from position 7 to position 8. In other words, the spring 46 overcomes spring 27. At this point, however, the clutch packing springs resist further lever movement with the result that the foot pad shifts the Bowden wire for the valve control. The movements of the valve mechanism may advantageously be divided into several distinct sections. The first section may be movement from that shown in Fig. 7 to that shown in Fig. 8 wherein the plunger 45 is shifted sufficiently to close the port 41. The shoulder 47 has not yet contacted with the valve member 52. The second section of movement of the valve and foot pad, from the position shown in Fig. 8 to that illustrated in Fig. 2. In Fig. 2 the shoulder 47 is just flush with the valve 52, but valve 52 is not yet opened. When the valve parts are in the position shown in Fig. 8 or the position shown in Fig. 2, or at any point between these positions, they are in what may be termed neutral position. The third section of movement is that from the position shown in Fig. 2 to that shown in Fig. 9 wherein the valve 52 is opened wide.

Let it be assumed that the vehicle is operating and the operator desires to release the clutch. The lever is shifted from the position in Fig. 7 to that of Fig. 8. Spring 46 prevents valve operation until the clutch packing springs offer resistance. The foot pad and valve parts now shift until valve 52 is opened, as illustrated in Fig. 9. Upon opening of the valve 52, which has been preceded by the closing of port 41, the chambers 50 and 51 are connected with the result that a partial vacuum is created in cylinder 33, the same being connected to the manifold of the engine through pipe lines 36 and 37. The piston 32 then is shifted by differential pressure with the motion from left to right (Fig. 6) thus releasing the clutch. The lever 20 moves with the piston and it may go substantially to the floor boards as shown in Fig. 9 thus partaking of the full stroke movement. The only effort on the part of the operator is that sufficient to overcome spring 27 and spring 46 as the clutch packing springs are compressed by the movement of the piston. The operator may merely follow the movement of the lever when the clutch is released to the end that the valve mechanism will remain open. When the operator stops further movement of his foot the valve 52 closes and the lever, piston and clutch mechanism remain held in fixed position as the line 36 is closed, it being appreciated that port 41 remains closed.

In engaging the clutch, the operator relieves the pressure from the pedal while it is in a position similar to that shown in Fig. 9. The lever 20 does not retract with this foot but remains held for an instant in its depressed position due to the differential pressures on the piston. At this time the spring 46 shifts the member 45 to the end that the valve 52 closes. Following this there is a slight neutral position between positions shown in Figs. 2 and 8 in which the valve 52 is closed; the port 41 is still unopened. Following this, the port 41 is opened allowing entrance of air for breaking the partial vacuum in one end of the cylinder. The clutch packing springs then effect a return movement of the piston and lever 20 with the lever 20 following the foot of the operator as it is lifted or retracted. The operator may retract his foot to permit the clutch lever to follow it in a rather rapid manner until the clutch is about to be finally engaged. This is the usual operation and the position for final clutch engagement, that is, the position which the lever may take at this time is that substantially illustrated in Fig. 8. Here the operator may slacken the movement of his foot, and further movement of the lever is stopped upon closing of the port 41. The parts may now be in a position as shown in Fig. 8 and the clutch may be controlled by the operator with a nicety, just at the point of final engagement. If, for example, the clutch has begun to engage too rapidly, a very slight pressure on the pad will open the valve 52. The extent of opening may be also controlled as the tapered end 56 of the valve effects a metering action. Thus the operator may slightly disengage the clutch at this time to prevent too rapid an engagement. By the slight release of pressure upon the pad the port 41 is opened and again the partial vacuum in the cylinder is broken to the end that the clutch starts to engage. During this engaging action the operator may control the clutch engagement by a slight shift of the pad positioning the pointed end 49 anywhere between the position shown in Figs. 7 and 8 thus metering the vacuum relief port.

It will be noted that there is a considerable range of movement of the pad relative to the lever in which the vacuum relief port may be controlled and metered; that there is also a considerable range of movement of the pad for metering the vacuum valve. It may be reiterated that the lever 20 may be stopped in its clutch engaging movement with the valve mechanism in the position shown in Fig. 8, and the operator being accustomed to clutch operation may effect this substantially at the point of final clutch engagement or disengagement; a slight downward pressure will effect the clutch releasing action, and that a slight upward relief of pressure will effect clutch engaging action. Accordingly there is a nicety of control at the crucial point which however only requires enough physical effort on the part of the operator to overcome spring 27 and spring 46. This physical effort is very small as compared to the power required to relieve the packing pressure of the clutch. The movements of the foot lever may be identical with that which any operator has been accustomed to give a clutch pedal, with the clutch release action a downward movement and the clutch engaging action by upward relief, with the physical effort, however, minimized.

A modified type of foot pad is shown in Fig. 10 wherein the pad 70 may be hinged as at 71 to a projecting part 72 on the lever 20, the pad being operatively associated with the Bowden wire 64. Such a construction would eliminate machining operations which are present in the form where the plunger 66 reciprocates in a bore in the lever.

The matter of connecting the vacuum cylinder and the vacuum breaking port to the atmosphere, or rather to atmospheric pressure, through the means of the crank case of the engine provides for lubricating the parts and at the same time for filtering the air which is taken in by these parts. The port 41 is one through which air enters, the same passing through tube 36 to the cylinder. Accordingly the valve and cylinder are lubricated by the oil laden mist. Of course the other end of the cylinder is lubricated by the oil laden mist entering through tube 38. When the clutch is released and partial vacuum set up in the end of the cylinder to which the tube 36 connects, some of the gaseous material in tube 36 and cylinder are sucked into the manifold of the engine. No ill effects come about from this as the gas had been more or less filtered as it was initially drawn from the crank case.

I claim:

1. A control device, comprising a lever, a valve housing movable with the lever, means operable by differential pressure and in unison with the lever in its controlling movement including a conduit extending through the valve housing, a valve member in the housing normally closing the conduit, a port in the housing for breaking the differential pressure, a plunger in the housing having a tapered end constituting a metering valve for said port, said plunger having a shoulder for engagement with the valve member, a foot pad on the lever movable with respect thereto, means interconnecting the foot pad and the plunger.

2. A control device, comprising a lever, a valve housing movable with the lever, means operable by differential pressure and in unison with the lever in its controlling movements including a conduit extending through the valve housing, a valve member in the housing normally closing the conduit, a port in the housing for breaking the differential pressure, a plunger in the housing having a tapered end adapted to be projected into said port and constituting a metering valve for said port, said plunger having a shoulder for engagement with the valve member, a foot pad on the lever movable with respect thereto, means interconnecting the foot pad and the plunger, said shoulder on the plunger being spaced from said valve whereby to permit of plunger movement to close said port prior to engagement of said shoulder with the valve to open said valve.

3. A control device comprising a lever, a valve housing movable therewith, means operable by differential pressure and in unison with the lever in its controlling movement including a conduit running through the valve housing, a valve member in the housing normally seated to close the conduit, a port in the housing normally open to break the differential pressure, a plunger in the housing having a tapered end for metering and closing said port, said seated valve member having a tapered end for metering the opening in the conduit, a foot pad movably mounted on the lever, means interconnecting the foot pad and plunger whereby upon movement of the foot pad relative to the lever the plunger is moved to close said port, and a lost play connection between the plunger and valve member effective for opening the valve member after the plunger has moved to close the port.

ERNEST E. WEMP.